United States Patent
Liu et al.

(10) Patent No.: US 10,621,124 B2
(45) Date of Patent: Apr. 14, 2020

(54) METHOD, DEVICE AND COMPUTER PROGRAM PRODUCT FOR ENABLING SR-IOV FUNCTIONS IN ENDPOINT DEVICE

(71) Applicant: EMC IP Holding Company LLC, Hopkinton, MA (US)

(72) Inventors: Fucai Liu, Beijing (CN); Fei Chen, Beijing (CN); Kun Wang, Beijing (CN)

(73) Assignee: EMC IP Holdings Company LLC, Hopkinton, MA (US)

( * ) Notice: Subject to any disclaimer, the term of this patent is extended or adjusted under 35 U.S.C. 154(b) by 0 days.

(21) Appl. No.: 16/298,431

(22) Filed: Mar. 11, 2019

(65) Prior Publication Data

US 2019/0324930 A1 Oct. 24, 2019

(30) Foreign Application Priority Data

Apr. 20, 2018 (CN) .......................... 2018 1 0360793

(51) Int. Cl.
*G06F 9/48* (2006.01)
*G06F 13/38* (2006.01)
*G06F 13/20* (2006.01)
*G06F 9/455* (2018.01)

(52) U.S. Cl.
CPC .......... *G06F 13/20* (2013.01); *G06F 9/45558* (2013.01); *G06F 2009/45579* (2013.01); *G06F 2213/0058* (2013.01)

(58) Field of Classification Search
None
See application file for complete search history.

(56) References Cited

U.S. PATENT DOCUMENTS

| | | | |
|---|---|---|---|
| 2003/0115380 A1* | 6/2003 | Ajanovic | G06F 13/124 710/1 |
| 2017/0344391 A1* | 11/2017 | Alvarez | G06F 9/45558 |

* cited by examiner

*Primary Examiner* — Hyun Nam
(74) *Attorney, Agent, or Firm* — Ryan, Mason & Lewis, LLP (57) ABSTRACT

A method, device and computer program product for enabling a Single Root Input/Output Virtualization (SR-IOV) function in an endpoint device. The method comprises: receiving, at an adapter, a request message from a virtual machine, the request message indicating an operation to be performed on the endpoint device by the virtual machine; parsing the request message to obtain a first request Transaction Layer Packet (TLP); determining whether a type of a first request TLP is a peer-to-peer transmission supported TLP or a peer-to-peer transmission unsupported TLP; in response to determining that the type of the first request TLP is a peer-to-peer transmission supported TLP, generating a second request TLP based on the first request TLP; and sending the second request TLP to the endpoint device. With this solution, the SR-IOV function is enabled in the endpoint device which does not support the SR-IOV function without the need of changing the endpoint device.

20 Claims, 5 Drawing Sheets

FIG. 5

METHOD, DEVICE AND COMPUTER PROGRAM PRODUCT FOR ENABLING SR-IOV FUNCTIONS IN ENDPOINT DEVICE

RELATED APPLICATION(S)

The present application claims priority to Chinese Patent Application No. 201810360793.6, filed Apr. 20, 2018, and entitled "Method, Device and Computer Program Product for Enabling SR-IOV Functions in Endpoint Device," which is incorporated by reference herein in its entirety.

FIELD

The present disclosure relates to the storage management field, and more specifically, to a method, device and computer program product of enabling a Single Root Input/Output Virtualization (SR-IOV) function in an endpoint device, to allow the endpoint device which does not support the SR-IOV function to implement the SR-IOV function.

BACKGROUND

Virtualization has always been a basic requirement in today's datacenter and a foundation for cloud as it may increase hardware utilization and reduce cost. In the current virtual environment, SR-IOV has become increasingly important because it allows a plurality of System Images (SI) (e.g., virtual machines running on hypervisor) to share the same Peripheral Component Interconnect (PCI) hardware resources. The SR-IOV is a novel virtualization method for high-speed PCI (PCIe) devices and is a standard developed by PCI Special Interest Group (SIG) that works in conjunction with a system chipset. The SR-IOV does not require the hypervisor to participate in Input/Output (I/O) operations and allows the device supporting the SR-IOV function to be assigned directly to a virtual machine, thereby providing better performance and lower latency.

Many endpoint devices do not consider cloud virtualization at all during design, such that a number of PCIe endpoint devices do not support an SR-IOV function. In order to support the SR-IOV function, it is required to re-design an endpoint controller of an Application Specific Integrated Circuit (ASIC) and re-write the firmware. However, it is known that the design and development cycle of ASICs is quite long and it is hard for ASICs to conform to the rapidly changing requirements of software. For example, many Non-Volatile memory express (NVMe) Solid State Disks (SSD) do not support the SR-IOV function. Hence, there is a need to use the SR-IOV function on the SR-IOV function unsupported endpoint device for virtualization.

SUMMARY

In view of the foregoing, the present disclosure provides a method, adapter and computer program product for enabling an SR-IOV function in an endpoint device, such that the endpoint device which does not support the SR-IOV function may implement the SR-IOV function.

According to one aspect of the present disclosure, there is provided a method of enabling an SR-IOV function in an endpoint device, comprising: receiving, at an adapter, a request message from a virtual machine, the request message indicating an operation to be performed on the endpoint device by the virtual machine; parsing the request message to obtain a first request Transaction Layer Packet (TLP); determining whether a type of the first request TLP is a peer-to-peer transmission supported TLP or a peer-to-peer transmission unsupported TLP; in response to determining that the type of the first request TLP is a peer-to-peer transmission supported TLP, generating a second request TLP based on the first request TLP; and sending the second request TLP to the endpoint device.

According to another aspect of the present disclosure, there is provided a device of enabling an SR-IOV function in an endpoint device. The device comprises: a receiving module configured to receive a request message from a virtual machine, the request message indicating an operation to be performed on the endpoint device by the virtual machine; a parsing module configured to parse the request message to obtain a first request TLP; a judging module configured to determine whether a type of the first request TLP is a peer-to-peer transmission supported TLP or a peer-to-peer transmission unsupported TLP; a data packet generating module configured to generate, in response to determining that the type of the first request TLP is a peer-to-peer transmission supported TLP, a second request TLP based on the first request TLP; and a sending module configured to send the second request TLP to the endpoint device.

According to a further aspect of the present disclosure, there is provided a computer program product tangibly stored on a non-transitory computer-readable medium and comprising machine-executable instructions, the machine-executable instructions, when executed, causing a machine to perform the method according to the above aspect.

According to the solution of the present disclosure, support for the SR-IOV function is enabled in the endpoint device which does not support the SR-IOV function by using the SR-IOV adapter without the need of changing the endpoint device. The host may deem all endpoint devices as the devices supporting the SR-IOV function, so as to enjoy the benefits of SR-IOV without the need of changing hardware/firmware of the endpoint device, which makes implementation of device virtualization easier. Moreover, the respective SR-IOV adapter is automatically reloaded using reconfigurable hardware, such as a Field-Programmable Gate Array (FPGA) via a software-hardware co-design, so as to alter the devices which do not support the SR-IOV function to be the devices supporting the SR-IOV function.

BRIEF DESCRIPTION OF THE DRAWINGS

Through the description of the specific implementations of the present disclosure with reference to the following drawings, the present disclosure will be better understood and other objectives, details, features and advantages of the present disclosure will become more apparent, wherein.

DETAILED DESCRIPTION

The preferred implementations of the present disclosure will be described hereinafter in more detail with reference to the drawings. Although the drawings show the preferred implementations of the present disclosure, it should be appreciated that the present disclosure may be implemented in various manners and should not be limited to the implementations stated herein.

Rather, the implementations are provided to make the present disclosure more thorough and complete and to fully convey the scope of the present disclosure to those skilled in the art.

At present, if it is expected to utilize a device that does not support the SR-IOV function in a virtual environment, a known solution is to pass through the device to the virtual machine or use a hypervisor software stack to virtualize the device. However, both of the solutions have some defects. If the endpoint device is passed through to the virtual machine, the device will be dedicated for the virtual machine and cannot be accessed by other virtual machines, such that the hardware utilization is extremely low. In virtualization of the device with the hypervisor software stack, all the accesses from different virtual machines have to go through the software stack. In such a case, the software stack becomes a bottleneck of the access path, which results in lower performance and larger latency.

Figure 1:
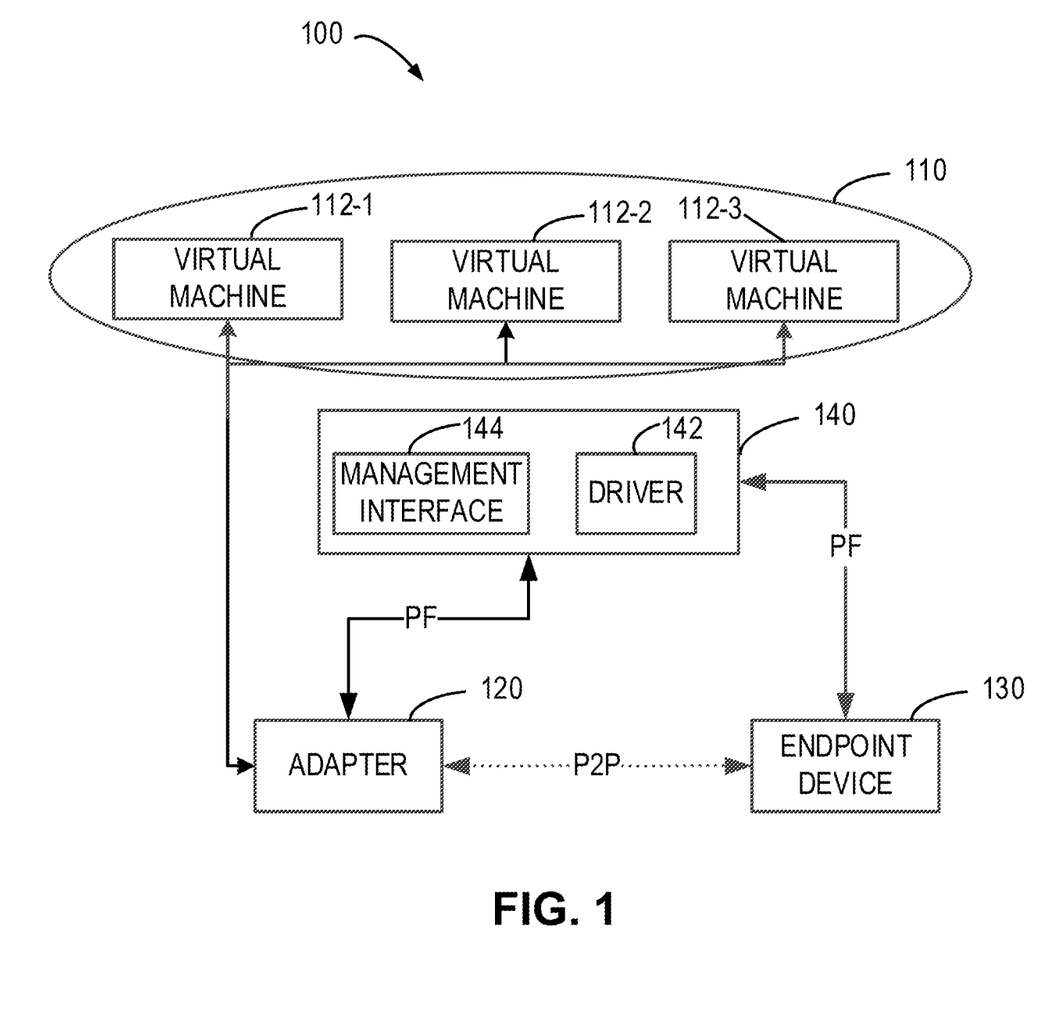
FIG. 1 illustrates a schematic diagram of a virtual environment according to embodiments of the present disclosure.

FIG. 1 illustrates a schematic diagram of a virtual environment 100 in accordance with embodiments of the present disclosure. As illustrated in FIG. 1, the virtual environment 100 includes a cloud 110 containing at least one virtual machine. FIG. 1 exemplarily illustrates three virtual machines 112-1, 112-2 and 112-3, collectively referred to as virtual machine 112. The virtual environment 100 further includes one or more endpoint devices 130 (FIG. 1 exemplarily illustrates one endpoint device 130), which for example may be a PCIe hardware device supporting or not supporting an SR-IOV function, such as SSD and the like.

A hypervisor 140 in the virtual environment 100 is used for implementing a call to the endpoint device 130 by the virtual machine 112. The endpoint device 130 may be defined as a Physical Function (PF) module in the virtual environment 100. The endpoint device 130 which supports the SR-IOV function may directly interact with the hypervisor 140 to implement the call to the endpoint device 130 by the virtual machine 112. However, for the endpoint device 130 which does not support the SR-IOV function, the virtual machine 112 cannot directly call the endpoint device 130. For this purpose, the virtual environment 100 according to the present disclosure also includes an adapter 120 which is provided to enable the SR-IOV function in the endpoint device 130 which does not support the SR-IOV function. In other words, the adapter 120 may act as an agent for the endpoint device 130 which does not support the SR-IOV function, and the adapter 120 simulates the endpoint device 130 and respectively provides a plurality of Virtual Functions (VF) for a plurality of virtual machines 112 on the hypervisor 140. Therefore, the adapter 120 is considered as one PF in the virtual environment 100, which is also connected to the hypervisor 140.

The hypervisor 140 may include a driver 142 and a management interface 144. In some cases, the driver 142 is used for cooperating with the adapter 120 to enable the SR-IOV function in the endpoint device 130. The management interface 144 is provided for managing the plurality of adapters 120 respectively pairing with different endpoint devices 130 and may automatically load the corresponding bit stream in accordance with the utilized endpoint device.

The adapter 120, for example, may be implemented using reconfigurable hardware (e.g., an FPGA), which will be described in detail hereinafter.

Figure 2:
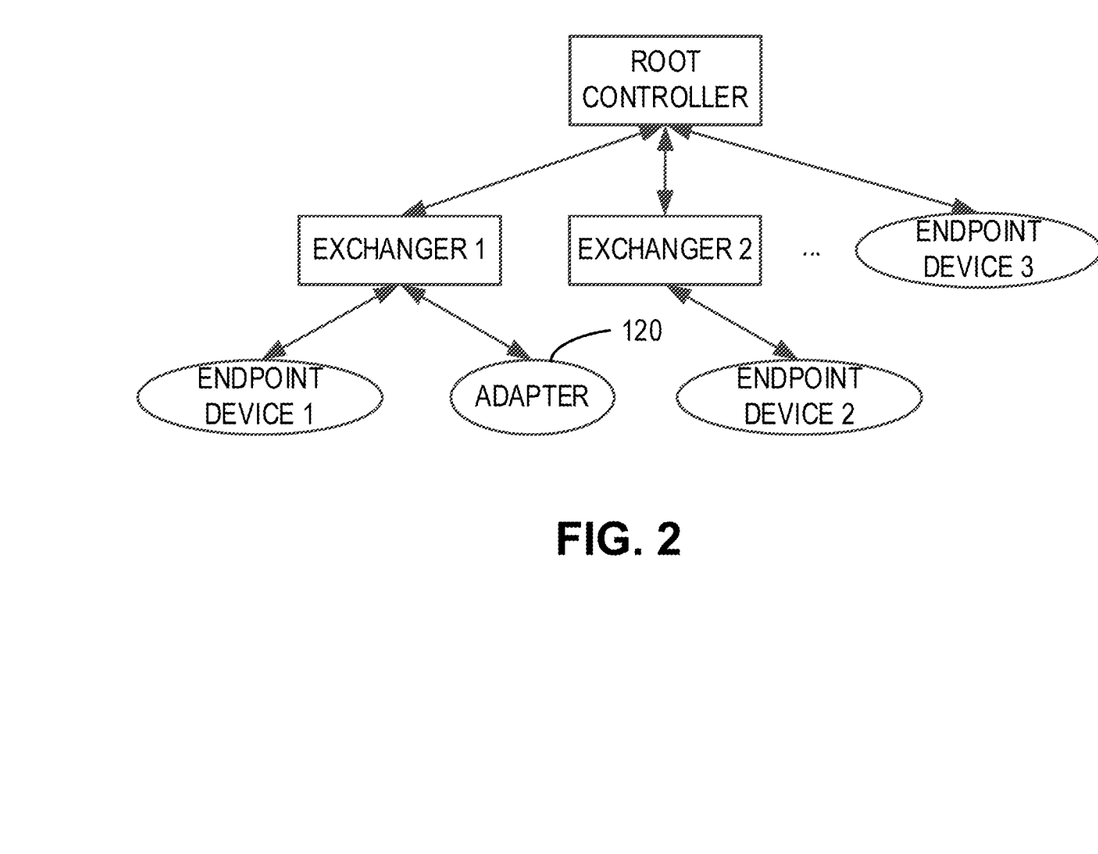
FIG. 2 illustrates a schematic diagram of a physical topological structure of an adapter.

FIG. 2 illustrates a schematic diagram of a physical topology of an adapter 120 in accordance with the present disclosure. As illustrated in FIG. 2, a root controller (such as a central processing unit of a host of a virtual machine etc.) connects to an endpoint device directly or via an exchanger (e.g., the root controller connects to endpoint device 1 via exchanger 1, connects to endpoint device 2 via exchanger 2, and connects directly to endpoint device 3 without an exchanger). For the endpoint device which does not support the SR-IOV function (such as the endpoint device 1 illustrated in FIG. 2), an independent adapter 120 may be configured to simulate the endpoint device and provide one or more Virtual Functions (VF) for the virtual machine.

Figure 3:
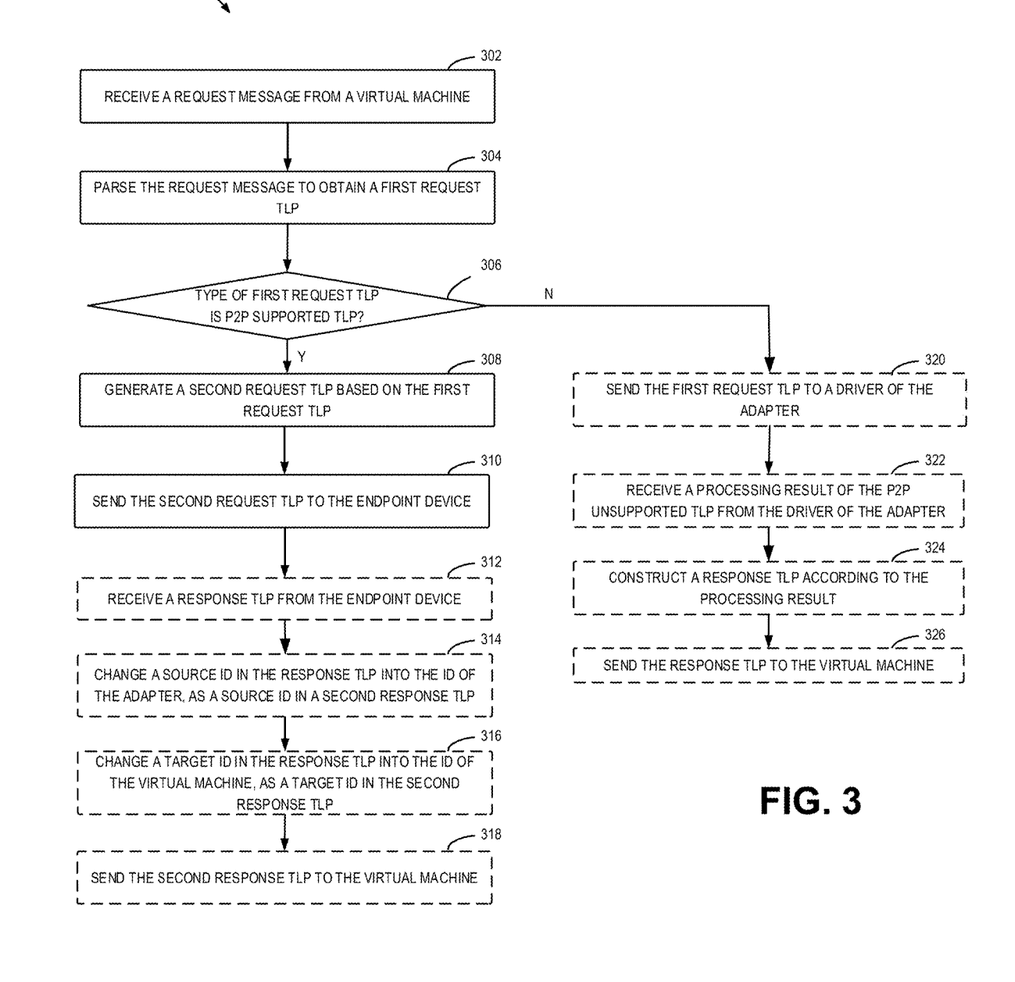
FIG. 3 illustrates a flowchart of a method of enabling an SR-IOV function in an endpoint device in accordance with embodiments of the present disclosure.

FIG. 3 illustrates a flowchart of a method 300 of enabling the SR-IOV function in an endpoint device in accordance with embodiments of the present disclosure. The method 300, for example, may be implemented in the adapter 120 of the endpoint device 130 which does not support the SR-IOV function as illustrated in FIGS. 1 and 2.

As illustrated in FIG. 3, at block 302, the adapter 120 receives a request message from a virtual machine 112 (e.g., any one of the at least one virtual machine 112 illustrated in FIG. 1). The request message indicates an operation to be performed on the endpoint device 130 by the virtual machine 112. The request message, for example, may be received from the virtual machine 112 by the adapter 120 using at least one virtual function between the adapter 120 and the virtual machine 112. In the virtual environment, the operation performed on the endpoint device 130 by the virtual machine 112, for example, may include at least one of a memory read operation, a memory write operation, a configuration read operation and a configuration write operation.

The request message is usually transmitted from the virtual machine 112 to the adapter 120 in a protocol format which is different from the adapter 120. Therefore, in order to process the request message, it is required for the adapter 120 to perform a protocol parse for the request message and generate a Transaction Layer Packet (TLP) which may be parsed by the endpoint device 130, for example, via a repackaged form.

At block 304, the adapter 120 performs a parse for the received request message to obtain a first request TLP.

The TLP used for the PCIe endpoint devices may be divided into two categories, i.e. a Peer-to-Peer communication (P2P)-supported TLP and a P2P-unsupported TLP. The former, for example, includes memory read TLP or memory write TLP, while the latter, for example, includes configuration read TLP or configuration write TLP.

For the P2P-supported TLP, it may be processed directly by the adapter 120; while for the P2P-unsupported TLP, it may be processed by the adapter 120 in cooperation with its driver, such as the driver 142 illustrated in FIG. 1.

For this purpose, at block 306, the adapter 120 determines whether the type of the first request TLP obtained at block 304 is a P2P-supported TLP or a P2P-unsupported TLP.

If it is determined, at block 306, that the type of the first request TLP is a P2P-supported TLP, the adapter 120 generates, at block 308, a second request TLP based on the first request TLP.

The TLP may include a source address field, a target address field, a type field, a length field, a data payload field and the like, wherein the source address field indicates an address or an identifier (ID) of the source device of the TLP while the target address field indicates an address or an ID of the target device of the TLP. Other fields of the TLP will not be described in detail herein.

Specifically, in the first request TLP, the source address is an address of the virtual machine 112 which sends the request message while the target address is the address of the adapter 120.

In some embodiments, the adapter 120 changes the source address in the first request TLP from the address of the virtual machine 112 into the address of the adapter 120, as the source address in the second request TLP. Then, the adapter 120 changes the target address in the first request TLP from the address of the adapter 120 into the address of the endpoint device 130, as the target address in the second request TLP. The address of the endpoint device 130 used herein may be a memory address which is obtained by performing said operation in the request message on the endpoint device 130 by the virtual machine 112.

Since a single endpoint device 130/adapter 120 may be accessed by a plurality of virtual machines, in order to correctly address a virtual machine which makes a request for the endpoint device 130, the adapter 120 may also store the mapping relationship between the request message and the source address of the request message (such as the address or the ID of the virtual machine 112).

At block 310, the adapter 120 directly sends the second request TLP to the endpoint device 130. As the second request TLP is a P2P-supported TLP, the adapter 120 may directly send it to the endpoint device 130 in a P2P manner. The endpoint device 130 may process the request TLP and return a response TLP in the P2P manner as the processing result.

The above blocks 302 to 310 illustrate a procedure of sending the request from the virtual machine 112 to the endpoint device 130 which does not support the SR-IOV function by using the adapter 120, which enables the SR-IOV function in said endpoint device 130. The above procedure may enable implementing the SR-IOV function without the need to make changes to the endpoint device 130.

In some embodiments, the method 300 also may optionally include a procedure of transmitting a response from the endpoint device 130 to the virtual machine 112, as indicated by the dashed boxes for blocks 312 to 318 of FIG. 3. At block 312, the adapter 120 receives the response TLP from the endpoint device 130 and generates the second response TLP (blocks 314 and 316) according to the response TLP. Specifically, the response TLP includes an address of the endpoint device 130 as a source address and an address of the adapter 120 as a target address.

At block 314, the adapter 120 changes the source address in the response TLP from the address of the endpoint device 130 into the address of the adapter 120, as the source address in the second response TLP.

At block 316, the adapter 120 changes, for example according to the mapping relationship between the request message and the virtual machine 112, the target address in the response TLP from the address of the adapter 120 into the address of the virtual machine 112, as the target address in the second response TLP.

At block 318, the adapter 120 sends the second response TLP to the virtual machine 112 according to the target address in the second response TLP.

In this way, for the P2P-supported TLP, the adapter 120, as an agent of the endpoint device 130, converts it into a P2P transaction to communicate with the endpoint device 130, so as to enable the SR-IOV function in the traditional endpoint device 130 which does not support the SR-IOV function.

On the other hand, due to the PCIe routing rule, the P2P-unsupported TLP cannot be processed directly, for example, by the adapter 120 in the form of an FPGA. TLPs of this type are relatively few in number and are not time-sensitive, so it is advised herein that the driver of the adapter 120 (such as the software driver 142 in the hypervisor 140 illustrated by FIG. 1) cooperates with the adapter 120 for processing.

Specifically, still referring to FIG. 3, in response to determining that the type of the first request TLP is a P2P-unsupported TLP at block 306, the adapter sends, at block 320, the first request TLP to the driver of the adapter 120. The driver of the adapter 120, for example, is a driver 142 which is located in the hypervisor 140 of the virtual machine 112.

In some embodiments, the adapter 120 may notify, via an interrupt instruction, the driver 142 that the first request TLP is a P2P-unsupported TLP.

In this case, the driver 142 may perform an operation on the endpoint device 130 directly according to the first request TLP, such as performing read or write operations on a configuration register of the endpoint device 130. Then, the driver 142 may return the processing result back to the adapter 120.

At block 322, the adapter 120 receives a processing result of the first request TLP by the driver 142 from the driver 142.

At block 324, the adapter 120 constructs, according to the processing result, a response TLP. For example, the adapter 120 may set the source address in the response TLP as the address of the adapter 120. The adapter 120 may set the target address in the response TLP as the address of the virtual machine 112 according to the mapping relationship between the request message and the virtual machine 112, so as to correctly address the response TLP to the virtual machine 112 which sends the request message.

At block 326, the adapter 120, for example, sends the response TLP to the virtual machine 112 based on the target address in the response TLP.

In the case where the adapter 120 is implemented by reconfigurable hardware (e.g., an FPGA), the adapter 120 may be divided into a static partition and a reconfigurable partition in accordance with its functions. The static partition is a partition where the function of an electric circuit remains unchanged and takes charge of function management of the adapter 120, such as the above functions described with reference to blocks 302 to 326. The reconfigurable partition is a partition where the electric circuit may change and may program bit streams desired by different users to the partition, such that the adapter 120 may also adapt to different endpoint devices 130 even without rebooting the system.

For example, since the adapter 120 may be connected with a plurality of virtual machines 112, there exists a situation where the plurality of virtual machines 112 simultaneously send a plurality of request messages (e.g., request message of performing the memory write operation) to the same target address of the endpoint device. Depending on the function of the endpoint device 130 per se, it may be required that a function for processing the above situation is configured for the endpoint device in the reconfigurable partition. In some embodiments, the adapter 120 may, for example, order a plurality of first request TLPs with the same target address from the plurality of virtual machines after obtaining the plurality of first request TLPs through parsing the plurality of request messages, and perform the operation on the each ordered first request TLP in sequence. To guarantee correct implementation of the updating of the same address, the adapter 120 should lock the target address prior to processing each request TLP.

Figure 4:
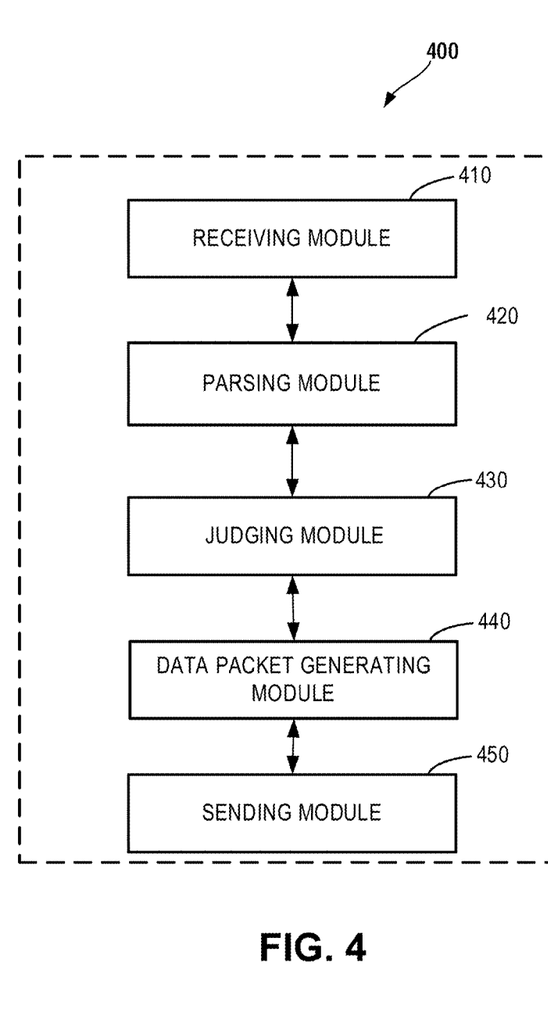
FIG. 4 illustrates a schematic diagram of a logic structure of a device according to the present disclosure.

FIG. 4 illustrates a schematic diagram of a logical structure of a device 400 in accordance with the present disclosure. The device 400, for example, may be the adapter 120 illustrated with reference to FIGS. 1 to 3, or may be implemented in the adapter 120.

As illustrated in FIG. 4, the device 400 may include a receiving module 410 configured to receive a request message from the virtual machine 112. The request message indicates an operation to be performed on the endpoint device 130 by the virtual machine 112. The device 400 may also include a parsing module 420 configured to parse the request message to obtain a first request TLP. The device 400 may also include a judging module 430 configured to determine whether the type of the first request TLP is a P2P-supported TLP or a P2P-unsupported TLP. The device 400 may also include a data packet generating module 440 configured to generate, in response to determining the type of the first request TLP as a P2P-supported TLP, a second request TLP based on the first request TLP. The device 400 may also include a sending module 450 configured to send the second request TLP to the endpoint device 130.

In some embodiments, the P2P-supported TLP includes memory read TLP or memory write TLP.

In some embodiments, the first request TLP contains an address of the virtual machine 112 as a source address and an address of the adapter 120 as a target address. In such a case, the data packet generating module 440 is also configured to change the source address in the first request TLP from the address of the virtual machine 112 into the address of the adapter 120 as the source address in the second request TLP, to change the target address in the first request TLP from the address of the adapter 120 into the address of the endpoint device 130 as the target address in the second request TLP, and to store the mapping relationship between the second request TLP and the virtual machine 112.

In some embodiments, the receiving module 410 is also configured to receive a response TLP in response to the second request TLP from the endpoint device 130. The response TLP includes the address of the endpoint device 130 and the address of the adapter 120, which are the source address and the target address, respectively. The data packet generating module 440 is also configured to change the source address in the response TLP from the address of the endpoint device 130 into the address of the adapter 120, for being used as the source address in the second response TLP, and to change, according to the mapping relationship between the request message and the address of the virtual machine 112, the target address in the response TLP from the address of the adapter 120 into the address of the virtual machine 112, for being used as the target address in the second response TLP. The sending module 450 is also configured to send the second response TLP to the virtual machine 112.

In some embodiments, the P2P-unsupported TLP includes configuration read request TLP or configuration write request TLP.

In some embodiments, the sending module 450 is also configured to send, in response to determining the type of the first request TLP as the P2P-unsupported TLP, the first request TLP to the driver 142 of the adapter 120, with the driver 142 of the adapter 120 being located in the hypervisor 140 of the virtual machine 112.

In some embodiments, the sending module 450 is also configured to notify, through an interrupt instruction, the driver 142 of the adapter 120 that the request TLP is a P2P-unsupported TLP, such that the driver 142 of the adapter 120 processes the TLP which does not support peer-to-peer transmission.

In some embodiments, the receiving module 410 is further configured to receive, from the driver 142 of the adapter 120, the processing result for the TLP which does not support peer-to-peer transmission by the driver 142. The data packet generating module 440 is also configured to construct a response TLP according to the processing result. The sending module 450 is also configured to send the response TLP to the virtual machine 112.

In some embodiments, the receiving module 410 is further configured to receive the request message from the virtual machine 112 using at least one virtual function between the virtual machine 112 and the adapter 120.

In some embodiments, the parsing module 420 is further configured to determine whether a plurality of first request TLPs with a same target address are received from a plurality of virtual machines 112, and order the plurality of first request TLPs in response to determining that the plurality of first request TLPs with the same target address are received from the plurality of virtual machines 112.

With the solution of the present disclosure, the SR-IOV function is enabled in the endpoint device which does not support the SR-IOV function (such as PCIe endpoint device) without the need of changing the endpoint device. With a software-hardware co-design method, the adapter as proposed redirects an access to the PCIe endpoint device from a processor of a host to the endpoint device and redirects from the endpoint device to the processor of the host, such that the endpoint device has SR-IOV support for the management program of the host.

Moreover, in some embodiments, the adapter 120 has a reconfigurable partition, such that new function units may be continuously and easily added into the design, and the local device function may be fixed or enhanced at any time according to the new requirements of software. For example, some integrity checks in the access path may be easily offloaded if needed.

In the foregoing description, the implementation of the adapter 120/device 400 has been described by taking reconfigurable hardware, such as an FPGA etc., as an example. However, the present disclosure is not restricted to such arrangements. Instead, the present disclosure may be implemented in the form of other reconfigurable or non-reconfigurable hardware, software or firmware.

Figure 5:
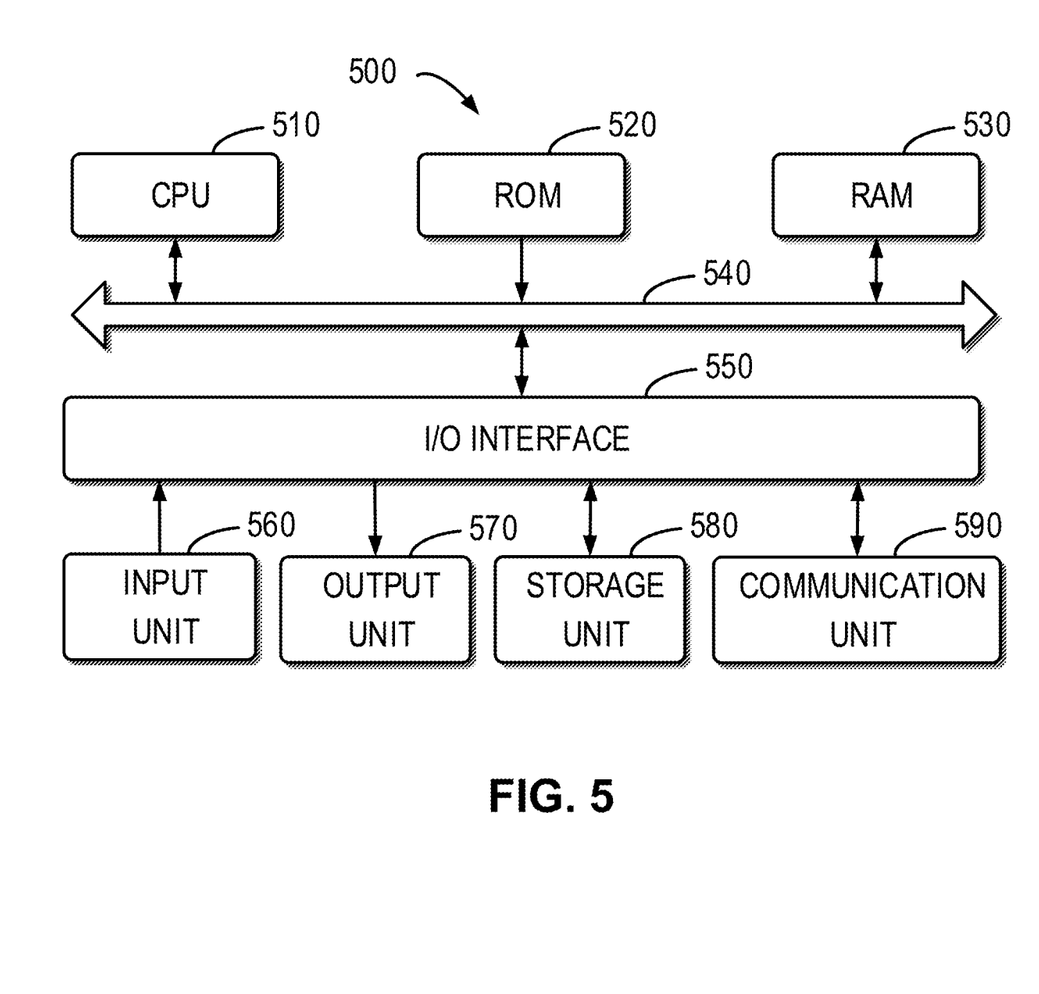
FIG. 5 illustrates a schematic block diagram of an example device for implementing embodiments of the present disclosure.

FIG. 5 illustrates a schematic block diagram of an example device 500 for implementing embodiments of the present disclosure. As illustrated, the device 500 includes a Central Processing Unit (CPU) 510, which may execute various suitable actions and processing based on the computer program instructions stored in the Read-Only Memory (ROM) 520 or computer program instructions loaded in the Random-Access Memory (RAM) 530 from a storage unit 580.

The RAM 530 may also store a variety of programs and data required by the operations of the device 500. CPU 510, ROM 520 and RAM 530 are connected to each other via a bus 540. The Input/Output (I/O) interface 550 is also connected to the bus 540.

A plurality of components in the device 500 are connected to the I/O interface 550, including: an input unit 560, e.g. keyboard, mouse etc.; an output unit 570, e.g., various kinds of display and loudspeakers etc.; a storage unit 580, e.g. disk and optical disk etc.; and a communication unit 590, e.g. network card, modem, wireless transceiver etc. The communication unit 590 allows the device 500 to exchange information/data with other devices via a computer network, e.g. Internet, and/or various telecommunication networks.

Each procedure and process described above, such as the method 300, may also be executed by the processing unit 510. For example, in some embodiments, the method 300 may be implemented as a computer software program tangibly included in the machine-readable medium, e.g., storage unit 580. In some embodiments, the computer program may be partially or fully loaded and/or mounted to the device 500 via ROM 520 and/or communication unit 590. When the computer program is loaded to RAM 530 and then executed by the CPU 510, one or more steps of the method 300 described above may be implemented.

The present disclosure may be a method, a device and/or a computer program product. The computer program product may include a computer-readable storage medium having computer-readable program instructions thereon for carrying out aspects of the present disclosure.

The computer-readable storage medium may be a tangible apparatus that retains and stores instructions used by the instruction executing apparatuses. For example, the computer-readable storage medium may be, but not limited to, electronic storage device, magnetic storage device, optical storage device, electromagnetic storage device, semiconductor storage device or any suitable combination thereof. More concrete examples of the computer-readable storage medium (non-exhaustive list) include: portable computer disk, hard disk, RAM, ROM, Erasable Programmable Read-Only Memory (EPROM or flash), Static Random-Access Memory (SRAM), portable Compact Disk Read-Only Memory (CD-ROM), Digital Versatile Disk (DVD), memory stick, floppy disk, mechanical coding devices, punched card stored with instructions thereon, or a projection in a slot, and any suitable combination thereof. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via a wire.

The described computer-readable program instruction may be downloaded from the computer-readable storage medium to a respective computing/processing device, or to an external computer or external storage via Internet, a local area network, a wide area network and/or a wireless network. The network may include copper transmission cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcode, firmware instructions, state setting data, or source codes or target codes written in any combination of one or more programming languages, wherein the programming languages consist of object-oriented programming languages, e.g., Smalltalk, C++ and so on, and the traditional procedural programming languages, such as "C" language or similar programming languages. The computer-readable program instructions may be implemented fully on the user computer, partially on the user computer, as an independent software package, partially on the user computer and partially on the remote computer, or completely on the remote computer or server. In the case involving the remote computer, the remote computer may be connected to the user computer via any type of networks, including Local Area Network (LAN) and Wide Area Network (WAN), or to the external computer (e.g., connected via Internet using the Internet service provider). In some embodiments, state information of the computer-readable program instructions is used to customize an electronic circuit, e.g., programmable logic circuit, FPGA or Programmable Logic Array (PLA). The electronic circuit may execute computer-readable program instructions to implement aspects of the present disclosure.

Aspects of the present disclosure are described herein with reference to flowcharts and/or block diagrams of methods, apparatus (systems) and the computer program products according to embodiments of the present disclosure. It should be understood that each block of the flowchart and/or block diagram and the combination of various blocks in the flowchart and/or block diagram may be implemented by computer-readable program instructions.

The computer-readable program instructions may be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flowchart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing aspects of the functions/actions stipulated in one or more blocks of the flowchart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flowchart and/or block diagram.

The flowchart and block diagram in the accompanying drawings illustrate system architecture, functionality and operation that may be implemented by systems, methods and computer program products according to embodiments of the present disclosure. In this regard, each block in the flowchart or block diagrams may represent a module, a part of program segment or code, wherein the module and the part of program segment or code include one or more executable instructions for performing the stipulated logic functions. In some alternative implementations, it should be noted that the functions indicated in the block may also take place in an order different from that indicated in the drawings. For example, two successive blocks may be in fact executed in parallel or sometimes in a reverse order dependent on the involved functions. It should also be noted that each block in the block diagram and/or flowchart and combination thereof may be implemented by a hardware-based system exclusive for executing the stipulated functions or actions, or by a combination of dedicated hardware and computer instructions.

Embodiments of the present disclosure have been described above and the above description is only exemplary rather than exhaustive and is not limited to the embodiments of the present disclosure. Many modifications and alterations will be apparent to those skilled in the art without deviating from the scope and spirit of the described embodiments. The terms used herein are chosen to best explain principles and actual applications of each embodiment and technical improvements made in the market by each embodiment, or enable others of ordinary skill in the art to understand embodiments of the present disclosure.

What is claimed is:

1. A method of enabling a Single Root Input/Output Virtualization (SR-IOV) function in an endpoint device, comprising:
   receiving, at an adapter, a request message from a virtual machine, the request message indicating an operation to be performed on the endpoint device by the virtual machine;
   parsing the request message to obtain a first request Transaction Layer Packet (TLP), the first request TLP comprising an address of the virtual machine as a source address and an address of the adapter as a target address;
   determining whether a type of the first request TLP is a peer-to-peer transmission supported TLP or a peer-to-peer transmission unsupported TLP;
   in response to determining that the type of the first request TLP is a peer-to-peer transmission supported TLP, generating a second request TLP by changing the source address of the first request TLP from the address of the virtual machine to the address of the adapter and changing the target address of the first request TLP from the address of the adapter to the address of the endpoint device; and
   sending the second request TLP to the endpoint device.

2. The method of claim 1, wherein the peer-to-peer transmission supported TLP comprises a memory read TLP or a memory write TLP.

3. The method of claim 1, wherein generating the second request TLP further comprises storing a mapping relationship between the request message and the virtual machine.

4. The method of claim 3, further comprising:
   receiving, from the endpoint device, a first response TLP in response to the second request TLP, the first response TLP comprising an address of the endpoint device as a source address and the address of the adapter as a target address;
   generating a second response TLP by changing the source address in the first response TLP from the address of the endpoint device into the address of the adapter and changing, according to the mapping relationship between the request message and the virtual machine, the target address in the first response TLP from the address of the adapter into the address of the virtual machine; and
   sending the second response TLP to the virtual machine.

5. The method of claim 1, wherein the peer-to-peer transmission unsupported TLP comprises a configuration read request or a configuration write request.

6. The method of claim 1, further comprising:
   in response to determining that the type of the first request TLP is a peer-to-peer transmission unsupported TLP, sending the first request TLP to a driver of the adapter, the driver of the adapter being located in a hypervisor of the virtual machine.

7. The method of claim 6, wherein sending the first request TLP to the driver of the adapter comprises:
   notifying, through an interrupt instruction, the driver of the adapter that the first request TLP is a peer-to-peer unsupported TLP, such that the driver of the adapter processes the peer-to-peer transmission unsupported TLP.

8. The method of claim 6, further comprising:
   receiving, from the driver of the adapter, a processing result of the peer-to-peer transmission unsupported TLP by the driver of the adapter;
   constructing a response TLP according to the processing result; and
   sending the response TLP to the virtual machine.

9. The method of claim 1, wherein receiving the message request from the virtual machine comprises:
   receiving, from the virtual machine, the request message using at least one virtual function between the virtual machine and the adapter.

10. The method of claim 1, further comprising:
    determining whether a plurality of first request TLPs with a same target address are received from a plurality of virtual machines; and
    in response to determining that the plurality of first request TLPs with the same target address are received from the plurality of virtual machines, ordering the plurality of first request TLPs with the same target address.

11. A device for enabling a Single Root Input/Output Virtualization (SR-IOV) function in an endpoint device, comprising:
    a receiving module configured to receive a request message from a virtual machine, the request message indicating an operation to be performed on the endpoint device by the virtual machine;
    a parsing module configured to parse the request message to obtain a first request Transaction Layer Packet (TLP), the first request TLP comprising an address of the virtual machine as a source address and an address of the adapter as a target address;
    a judging module configured to determine whether a type of the first request TLP is a peer-to-peer transmission supported TLP or a peer-to-peer transmission unsupported TLP;
    a data packet generating module configured to generate, in response to determining that the type of the first request TLP is a peer-to-peer transmission supported TLP, a second request TLP by changing the source address of the first request TLP from the address of the virtual machine to the address of the adapter and changing the target address of the first request TLP from the address of the adapter to the address of the endpoint device; and
    a sending module configured to send the second request TLP to the endpoint device.

12. The device of claim 11, wherein the peer-to-peer transmission supported TLP comprises a memory read TLP or a memory write TLP.

13. The device of claim 11, wherein the data packet generating module is further configured to store a mapping relationship between the second request TLP and the address of the virtual machine.

14. The device of claim 13, wherein
    the receiving module is further configured to receive, from the endpoint device, a first response TLP in response to the second request TLP, the first response TLP comprising an address of the endpoint device as a source address and the address of the device as a target address;

the data packet generating module is further configured to generate a second response TLP by changing the source address in the first response TLP from the address of the endpoint device into the address of the device and changing, according to the mapping relationship between the request message and the address of the virtual machine, the target address in the first response TLP from the address of the device into the address of the virtual machine; and the sending module is further configured to send the second response TLP to the virtual machine.

15. The device of claim 11, wherein the peer-to-peer transmission unsupported TLP comprises a configuration read request or a configuration write request.

16. The device of claim 11, wherein the sending module is further configured to:

send, in response to determining that the type of the first request TLP is a peer-to-peer transmission unsupported TLP, the first request TLP to a driver of the device, the driver of the device being located in a hypervisor of the virtual machine.

17. The device of claim 16, wherein the sending module is further configured to:

notify, through an interrupt instruction, the driver of the device that the request TLP is a peer-to-peer unsupported TLP, such that the driver of the device processes the peer-to-peer transmission unsupported TLP.

18. The device of claim 16, wherein the receiving module is further configured to receive, from the driver of the device, a processing result of the peer-to-peer transmission unsupported TLP by the driver of the device;

the data packet generating module is further configured to construct a response TLP according to the processing result; and the sending module is further configured to send the response TLP to the virtual machine.

19. The device of claim 11, wherein the receiving module is further configured to receive, from the virtual machine, the request message using at least one virtual function between the virtual machine and the device; and the parsing module is further configured to determine whether a plurality of first request TLPs with a same target address are received from a plurality of virtual machines, and to order, in response to determining that the plurality of first request TLPs with the same target address are received from the plurality of virtual machines, the plurality of first request TLPs with the same target address.

20. A computer program product tangibly stored on a non-transitory computer-readable medium and comprising machine-executable instructions, the machine-executable instructions, when executed, causing a machine to perform a method of enabling a Single Root Input/Output Virtualization (SR-IOV) function in an endpoint device, comprising:

receiving, at an adapter, a request message from a virtual machine, the request message indicating an operation to be performed on the endpoint device by the virtual machine;

parsing the request message to obtain a first request Transaction Layer Packet (TLP), the first request TLP comprising an address of the virtual machine as a source address and an address of the adapter as a target address;

determining whether a type of the first request TLP is a peer-to-peer transmission supported TLP or a peer-to-peer transmission unsupported TLP;

in response to determining that the type of the first request TLP is a peer-to-peer transmission supported TLP, generating a second request TLP by changing the source address of the first request TLP from the address of the virtual machine to the address of the adapter and changing the target address of the first request TLP from the address of the adapter to the address of the endpoint device; and sending the second request TLP to the endpoint device.

* * * * *